United States Patent [19]

Shimizu

[11] 4,330,192
[45] May 18, 1982

[54] INTERCHANGEABLE LENS ASSEMBLY FOR A CAMERA

[75] Inventor: Seiichi Shimizu, Kawasaki, Japan

[73] Assignee: Canon Kabushiki Kaisha, Tokyo, Japan

[21] Appl. No.: 222,731

[22] Filed: Jan. 2, 1981

[30] Foreign Application Priority Data

Jan. 18, 1980 [JP] Japan .................................. 55-5101
Jan. 23, 1980 [JP] Japan .................................. 55-6687

[51] Int. Cl.³ .................... G03B 17/00; G03B 9/02
[52] U.S. Cl. .................................. 354/286; 354/272
[58] Field of Search ................ 350/252, 255, 257; 354/270–274, 286

[56] References Cited

U.S. PATENT DOCUMENTS

3,858,225  12/1974  Hasegawa et al. ............. 354/286 X
3,906,534  9/1975   Shirasaki ........................ 354/286

FOREIGN PATENT DOCUMENTS

2805210  8/1978  Fed. Rep. of Germany ...... 354/272
778209   7/1957  United Kingdom ............... 354/272

*Primary Examiner*—Donald A. Griffin
*Attorney, Agent, or Firm*—Toren, McGeady and Stanger

[57] ABSTRACT

A photographic interchangeable lens assembly which includes a diaphragm mechanism is provided with an aperture value transmitting member and a diaphragm actuating lever which extend axially from the lens assembly to the camera and which are moved relative to the camera when the lens assembly is attached with the camera. In order to enable these elements to be appropriately located relative to corresponding operating elements in the camera, at least one of the elements, and preferably the diaphragm actuating lever, is formed with a mechanism enabling axial contraction thereof so that a desired relative positioning, or exchange of relative locations, may be effected between the transmitting member in the lens assembly and the corresponding actuating member in the camera body when the lens assembly is mounted in operative position.

17 Claims, 12 Drawing Figures

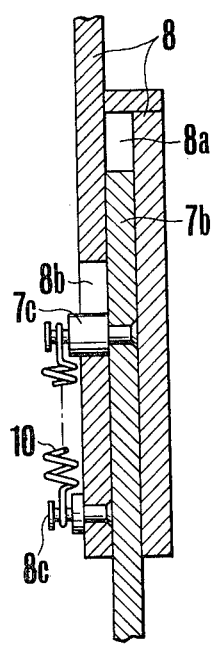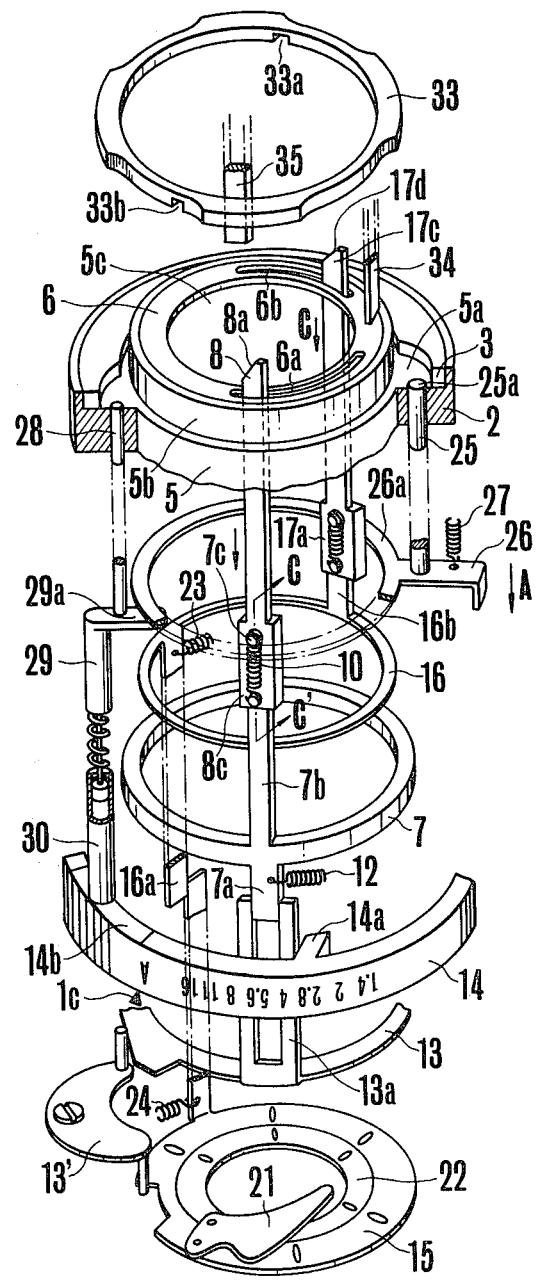

INTERCHANGEABLE LENS ASSEMBLY FOR A CAMERA

The present invention relates generally to photographic equipment and more particularly to an interchangeable lens assembly for a camera. The invention is more specifically directed to the elements which effect operative connection between a diaphragm mechanism in the lens assembly and a control mechanism therefor in the camera body.

In the prior art, the requirement that there be established an operative connection between signal transmitting means in the camera and cooperating means in the lens, and between the diaphragm drive member in the camera and the driven member of the diaphragm mechanism in the lens, is not always fulfilled. Depending upon the manner in which the lens assembly and the camera is combined, and depending upon the arrangement or relationship between signal transmitting members and drive members in the lens assembly and in the camera, there may result a very complicated interconnection mechanism so that proper alignment of the operating elements may be reversed or disturbed during mounting of the lens assembly upon the camera.

It will be understood that contemporary lens assemblies will include at least two transmission members which extend axially from the lens assembly into the camera and which will be actuated by control members in the camera during camera shutter action.

One of the elements in the lens assembly is normally an element which transmits a signal representative of the aperture value which is set on the lens. Another member delivers the driving force from the camera which actuates the diaphragm assembly. When the lens assembly is mounted on the camera and rotated for this purpose, these members may also move, depending upon the type of lens assembly involved and such movement must be compensated in order that proper camera operation will occur. Particularly, it is essential that during the mounting of the lens assembly upon the camera, the transmission elements in the lens assembly be properly aligned with cooperating control elements in the camera after the lens assembly has been brought to its final, operative mounted position. The present invention is directed toward provision of a mechanism for facilitating the attachment operation of the lens assembly to the camera body, and particularly toward avoiding interference between signal transmission members in the lens assembly with elements in the camera body when the assembly is attached to the camera. One example of such interference may occur when using certain types of lens assemblies as a result of interference of a signal transmitting member in the lens assembly with the reflex mirror support member in the camera body.

Such interference may be attributable to the distance between the attachment reference position of the lens relative to the focal plane of the camera, the length of the projected portion of the lens signal transmitting member extending outwardly of the lens assembly and the position and length of the camera side signal transmitting member. In order to avoid interference between the lens side signal transmitting member and the camera side support member when the lens is attached to the camera body, it may be required that the signal transmitting member in the camera be positioned nearer to the lens. This expedient may lead to an increase in the bulkiness of the camera body and this is not desirable.

Thus, a further aim of the invention is to avoid problems such as this. The present invention is directed toward provision of an interchangeable lens assembly having a selection signal transmitting mechanism for transmitting a selection signal of either a manual adjustment or an automatic adjustment of the diaphragm operating ring of the lens to the camera body and a lock mechanism for locking the interchangeable lens assembly in a predetermined position on the camera, with means being provided to render it possible to attach or detach the interchangeable lens assembly to or from the camera body by a single operation.

In such a case, where the members which constitute the selection signal transmitting mechanism and the lock mechanism extend from the lens to the camera, as the interchangeable lens assembly is being turned in the detaching operation, the extending members of the selection signal transmitting mechanism and the lock mechanism must be retracted from the interior of the camera housing.

With an interchangeable lens asembly of a construction such as that previously described, the detaching operation is performed by rotating the lens assembly relative to the camera body during which time the transmitting members extend into the interior of the camera housing. As the detaching operation is performed, these members are removed from the camera at least to the extent that they are separated from a coupling surface with the camera. When the number of members extending between the camera and the lens assembly is greater than one, it is impossible to perform a retracting operation and the detaching operation simultaneously.

Accordingly, the present invention seeks to provide a mechanism which will enable such a retracting operation to be performed together with the detaching operation with greater ease.

Thus, the first aim of the invention is to provide an interchangeable lens assembly mounting mechanism having an actuating member whose position relative to a drive member in the camera body may be interchanged during the time that the lens assembly is attached to the camera body.

The invention seeks to provide a mechanism wherein the relative positioning between lens assembly and camera elements may be accomplished by a mechanism of simplified structure which will have the smallest size possible.

A third aim of the invention is to provide a mechanism of the type described which will prevent mechanical interference between the operative members in the interchangeable lens assembly and parts in the camera body thereby preventing interference with operation of attaching the lens assembly to the camera.

Furthermore, the invention is intended to provide a structure including a locking mechanism operative between the interchangeable lens assembly and the camera body as well as a release mechanism therefor.

A fifth goal of the invention is the provision of a mechanism which is capable of controlling the operation of a member which causes transmission of a signal between the camera and the lens assembly, which signal is representative of a change in the exposure control mode. More specifically, the invention enables control of the projecting and retracting movement of the signal member to and from the camera body in response to releasing operation of the locking mechanism.

SUMMARY OF THE INVENTION

Briefly, the present invention may be described as an interchangeable lens assembly particularly for use with a camera which includes an exposure control mechanism and a diaphragm actuating mechanism. The interchangeable lens assembly of the invention includes coupling means adapted to engage complementary coupling means on the camera for mounting the lens on the camera. The lens assembly also includes an exposure control mechanism for determining the quantity of exposure light passing through the lens assembly. An exposure signal transmission member extends from the lens assembly into the camera and depending upon the setting of a diaphragm aperture value setting ring, the aperture value transmitting member will operate to effect the designated aperture value in the diaphragm mechanism when the camera shutter is released. The lens assembly also includes a diaphragm actuating member which extends into the camera body into cooperative relationship with the diaphragm actuating mechanism in the camera.

In order to enable proper positioning of the aperture signal transmitting member and the diaphragm actuating member relative to the cooperating members in the camera body when the lens assembly is attached to the camera body, the present invention provides construction means whereby the diaphragm mechanism actuating member in the lens assembly may be axially contracted in order to enable proper positioning thereof when the lens assembly is attached to the camera.

A similar mechanism may be provided for the aperture signal transmitting means to accomplish a similar purpose.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the Drawings:

FIG. 7 is an exploded perspective view depicting a second embodiment of the invention; and FIG. 8 is a sectional view taken along the line C-C' of FIG. 7.

DESCRIPTION OF THE PREFERRED EMBODIMENTS

Figure 1:
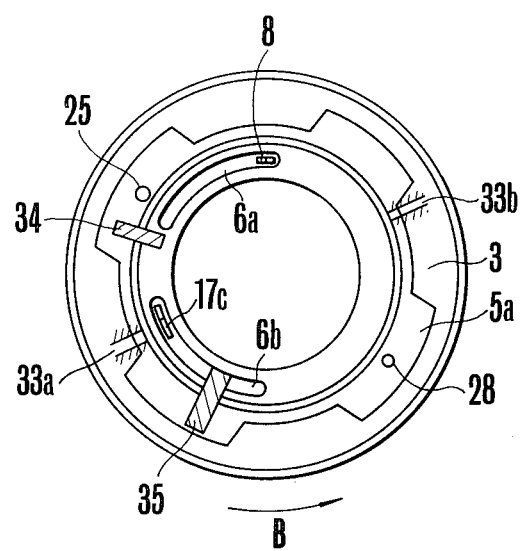
FIGS. 1 and 2 are rear views of an interchangeable lens assembly showing the relative positioning of operative components located in the lens assembly as well as cooperating components located in the camera body.
Figure 2:
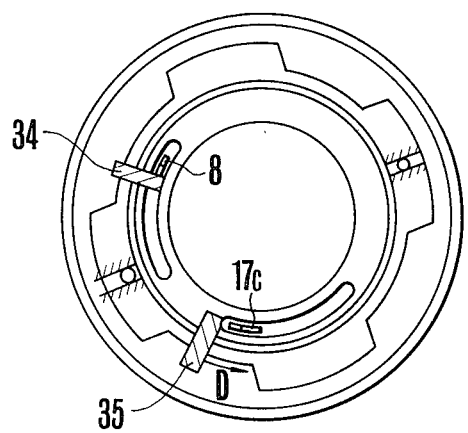

Referring now to the drawings wherein similar reference characters are used to designate like parts throughout the various figures thereof, various aspects of the operating condition of the interchangeable lens assembly of the invention and of a camera upon which it may be operatively mounted are depicted particularly in FIGS. 1, 2, 3a, 3b and 3c. FIGS. 1 and 2 depict an interchangeable lens assembly as viewed from the rear, with FIG. 1 showing the alignment thereof relative to a camera body with the parts in position before the lens assembly is rotated into a tightened and mounted position on the camera body. FIG. 2 is a similar view showing the positioning of the parts after the lens assembly has been mounted and tightened on the camera body.

Figure 3A:
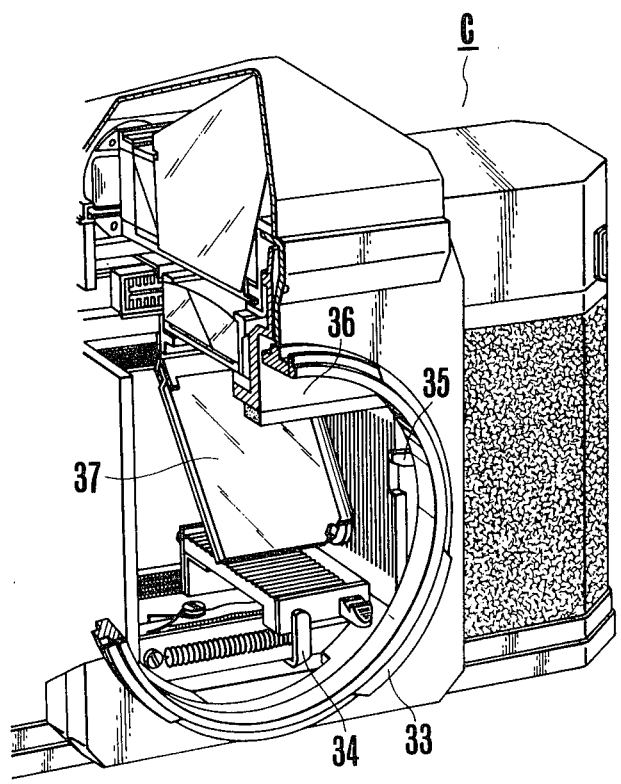
FIG. 3a is a perspective view partially broken away and partially in section showing a camera body as viewed from the front thereof with the interchangeable lens assembly removed.
Figure 3B:
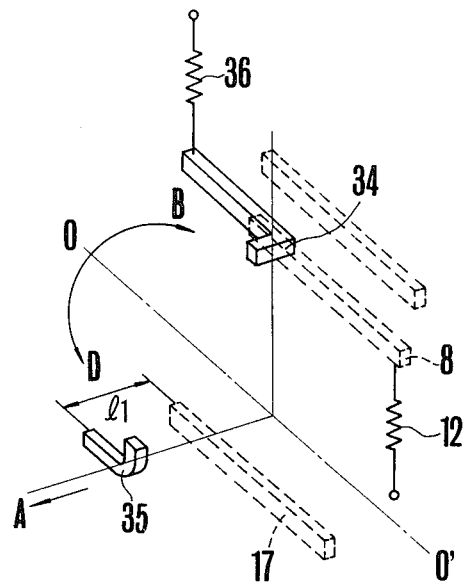
FIGS. 3b and 3c are schematic diagrams in perspective showing various relative operating positions of cooperating elements in the lens assembly and in the camera body.

In FIG. 3a there is shown the positions of a diaphragm signal member and a drive member in the camera body with FIG. 3b showing the positions of signal and drive members in the camera body relative to the positions of cooperating members in the lens assembly.

As shown in the drawings, a signal transmitting member 8 is disposed in the lens assembly so as to be movable within an arcuate slot 6a. An actuating lever 17 is disposed in the lens assembly so as to be movable within an arcuate 6b. A signal transmitting member 34 is supported in a camera body and cooperates with an exposure control mechanism. An actuating lever 35 arranged in the camera body operates by being driven through a release actuating mechanism of the camera.

After the lens assembly has been attached, when the camera is released, the actuating lever 35 will be driven to move in a direction indicated by arrow D in FIG. 3b and its motion will be transmitted to the actuating lever 17 in the lens assembly whereby a diaphragm mechanism in the lens asembly will be actuated as a result of the action of the actuating lever 17.

When the interchangeable lens assembly is mounted and engaged in operative position on the camera body, it is required that the actuating lever 17 be moved from the position depicted in FIG. 1, before attachment of the lens assembly on the camera body, to the position of FIG. 2, after attachment of the lens assembly on the camera body.

Figure 3C:
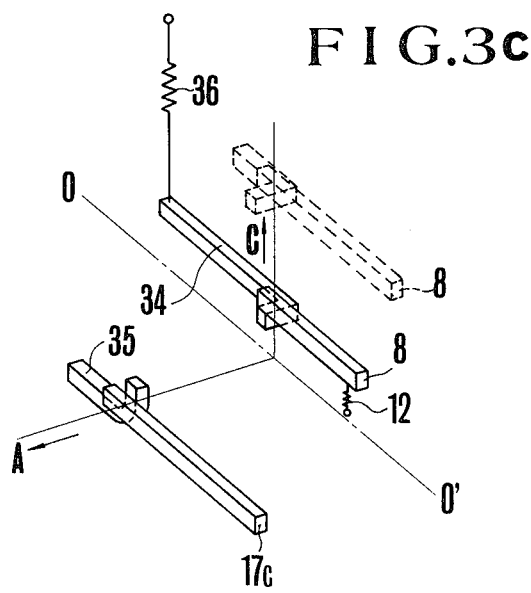

Considering this aspect of the operation of the invention in greater detail, and with particular reference to FIGS. 3b and 3c, the signal member 34 and the drive member 35 which are located in the camer will initially assume the positions indicated in solid line in FIG. 3b, these being positions before the lens assembly is attached to the camera body.

During the time that the interchangeable lens assembly is being attached to the camera body, at which time the relative positioning between the lens assembly and the camera body is in the process of changing due to rotation of parts of the lens assembly, a particular spatial relationship between the various operating members will be established as shown in FIG. 3b.

When the lens assembly is first positioned relative to the camera preparatory to performing the attachment operation, during which index registration of index marks on the lens assembly and on the camera body will be established, the lens side signal member 8 is positioned above the camera side signal member 34 and the lens side actuating member 17 is positioned at a predetermined distance 11 from the camera side drive member 35, as shown in the drawings.

After this position is established, a tightening operation is performed whereby the lens assembly is rotated about its optical axis while the camera body is held stationary thereby mounting the lens assembly on the camera body by effecting engagement with coupling means which may comprise either a bayonet coupling or a screw-thread coupling device. After the interchangeable lens assembly has been attached to the camera body, the spatial relationships between the operating members on the camera side and the operating members on the lens side will be changed, as depicted in FIG. 3c.

The camera side signal transmitting member 34 will be moved from the dashed-line position shown in FIG. 3c to the solid line position while being pushed by the lens side signal member 8. Furthermore, although the camera side drive member 35 remains in the same position it held previous to the attachment operation, it is required that the lens side actuating member 17 change its position to a location on the opposite side of the member 35 after the attachment operation has been completed.

The camera side signal member 34 has its movement restricted under the force of a spring 36 in the camera. By attaching the lens assembly to the camera, the signal member 34 has imparted thereto a bias force in the direction of the arrow C. Additionally, the signal member 8 is biased by a spring tensioned in the lens assembly. When the diaphragm mechanism in the lens assembly is manually set to a particular aperture value, the signal member 8 will be moved in the direction of arrow C in response to this set aperture value and in response to this movement the camera side signal member 34 will be moved in the same direction as arrow C whereby the set aperture value will be transmitted from the lens side to the camera side.

In the case where the lens assembly is set in the automatic exposure control mode, an exposure control mechanism (not shown) mounted in the camera body and responsive to object brightness, shutter speed, film sensitivity and the like will produce an aperture information signal which is to be established thereby controlling the degree of movement to the signal member 34. This degree of movement is transmitted to the lens side member 8 thereby controlling the size of the aperture opening.

The drive member 35 in the camera will move in the direction of arrow A in response to shutter actuation of the camera while at the same time effecting movement of the lens side actuating member 17. The member 17 moving in response to the control from the camera, will drive or actuate a portion of the diaphragm mechanism in the lens assembly in order to actuate the diaphragm blades thereof to effect a predetermined aperture value when an exposure occurs, this aperture value being, of course, determined either as a result of a manual setting of the lens assembly or through setting to the automatic exposure mode.

Thus, it will be apparent that during the time that the lens assembly is mounted upon the camera, certain positional relationships must be established between operating elements in the camera and operating elements in the lens assembly after the lens assembly has been mounted in operating engagement with the camera. In particular, the operating elements in the lens assembly must adjust their position relative to components in the camera so that they may be appropriately responsive to, and so that they may effectively cooperate with, corresponding or complementary components in the camera.

Figure 4A:
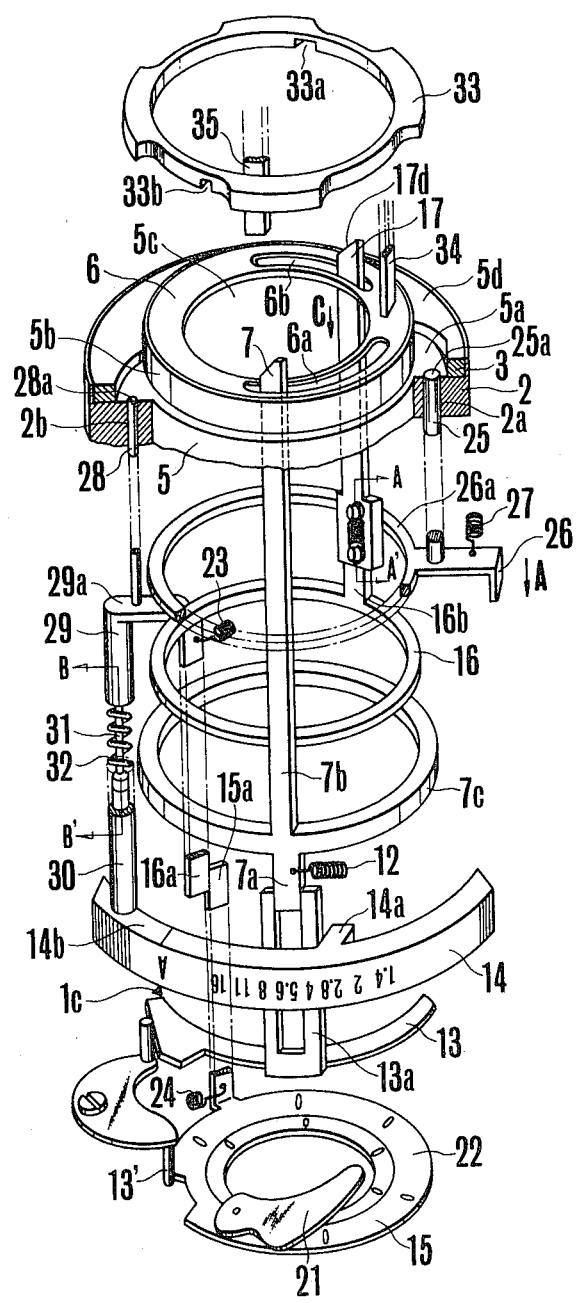
FIGS. 4a and 4b are exploded perspective views showing in greater detail a first embodiment of the interchangeable lens assembly in accordance with the present invention.
Figure 4B:
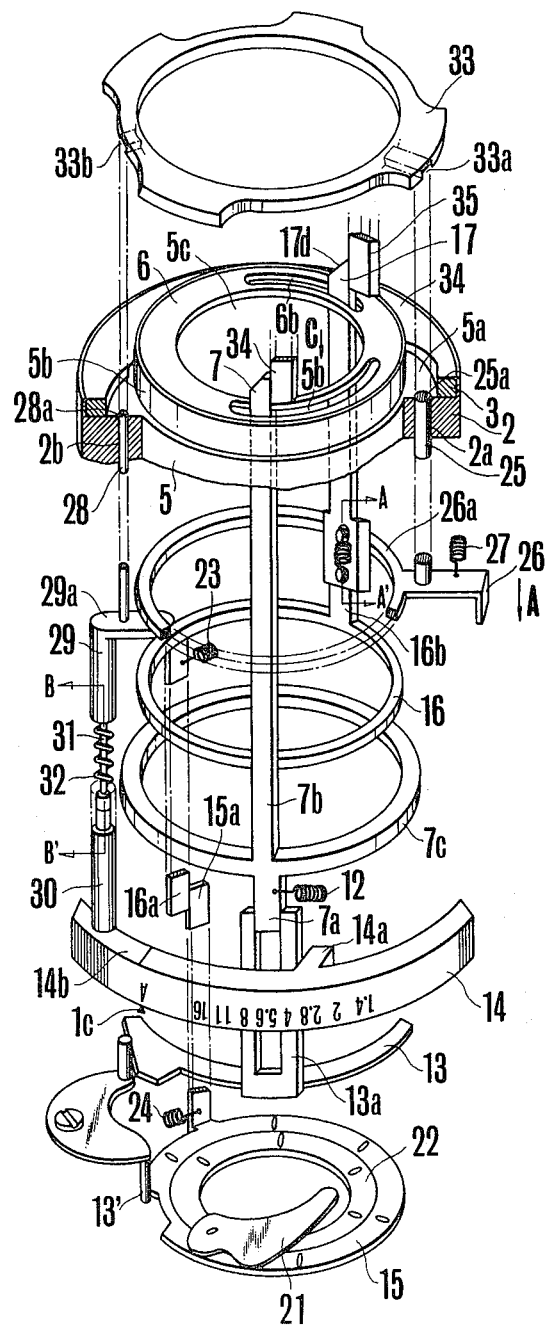
Figure 4C:
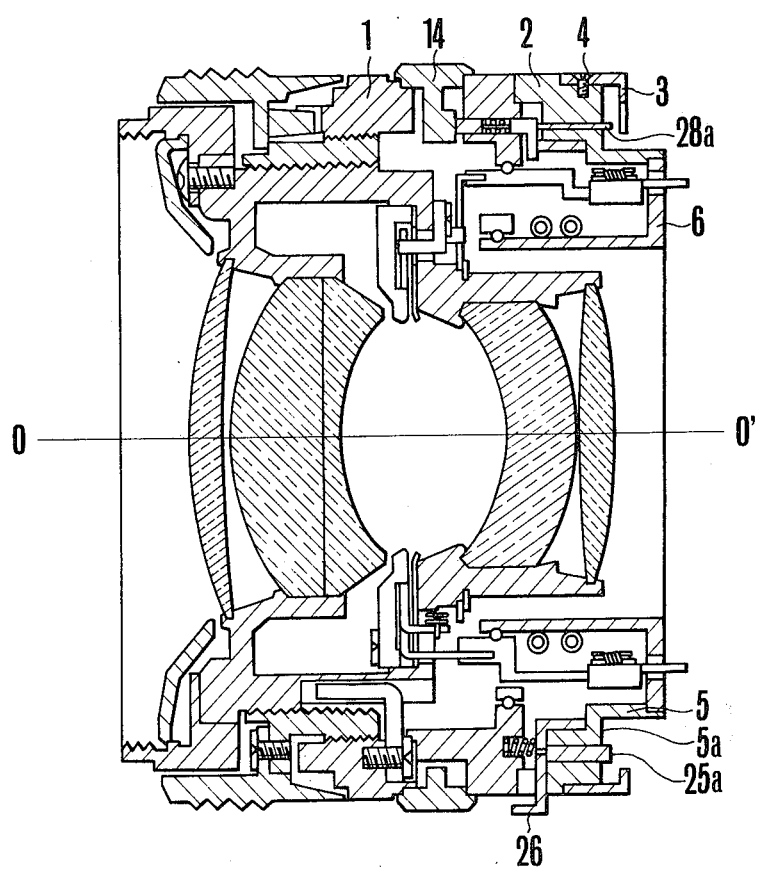
FIG. 4c is a sectional view of the lens assembly of FIGS. 4a and 4b.

A first embodiment of the present invention is shown in FIGS. 4a, 4b and 4c. As shown therein, the assembly of the invention includes a fixed lens barrel member 1 having an annular configuration, a bayonet ring 2 affixed with the lens barrel 1 at the rear end thereof and a bayonet member 3 connected with the ring 2 by fasteners or screws 4.

A mount member 5 is affixed to the stationary lens barrel 1 and serves as a guide when the interchangeable lens assembly is attached to the camera. The mount member 5 includes a fitting reference surface 5a for attachment of the lens assembly to the camera body, a tubular portion 5b which serves as a guide element therefor and a light transmitting aperture 5c with coupling means 5d being provided for mounting the lens upon the camera.

At the rear end of the mounting member 5 there is affixed a rear cover member 6.

The lens assembly shown in FIGS. 4a and 4b includes an aperture value signal transmitting member 7 which is formed with axially elongated arm portions 7a and 7b and which is rotatably supported in the lens assembly by a ring portion 7c cooperatively engaged with the lens barrel 1. The signal transmitting member 7 is urged in a counterclockwise direction by a spring 12 which is tensioned between the member 7 and the lens barrel 1. The arm 7a of the signal transmitting member 7 engages a preset cam ring 13 and through the action of the spring 12 urges the preset cam ring 13 in a clockwise direction. The ring 13, as shown in the drawing, is an operating part of the diaphragm mechanism of the lens assembly and operates to effect actuation of an actuating ring 15 of the diaphragm mechanism by means of a crank lever 13'. The preset cam ring 13 includes an arm 13a which extends into engagement with the arm portion 7a and which also is arranged to abut upon a projected engagement portion 14a of a diaphragm setting ring 14 which is rotatably fitted on the interior of a recessed portion of the lens barrel 1. As a result of the abutment of the arm 13a against the projected portion 14a, and through the engagement of the arm portion 7a with the arm 13a, the spring member 12 operates to apply a spring force against the projected portion 14a whereby the diaphragm setting ring is thus urged in a clockwise direction by the operation of the spring 12. When the lens assembly is in mounted position upon the camera, the diaphragm setting ring 14 may be manually adjusted to a set aperture value and as the ring 14 is rotated relative to the lens barrel 1 a certain stopping force will be applied thereto by means of a click mechanism (not shown) which is conventional in the art. The signal transmitting member 7 is so arranged that its position will be determined by the set position of the diaphragm setting ring in order that a set aperture value may be established. Thus, the signal transmitting member 7 will be movable in the arcuate slot 6a under the influence of the diaphragm setting ring 14 and will be positioned depending upon the set position of the ring 14. The preset cam ring 13 and the crank lever 13', both of which constitute part of the presetting mechanism of the diaphragm mechanism of the lens assembly, will also be appropriately positioned depending upon the aperture value which is set.

An actuating member 16 responsive to a camera release operation for actuating the diaphragm mechanism of the interchangeable lens assembly is rotatably supported in the stationary barrel 1. The actuating member 16 includes axially elongate arm portions 16a and 16b, with the arm portion 16a being arranged in engagement with an arm portion 15a of the diaphragm actuating ring 15. The arm portion 16b is connected with the actuating lever 17.

Figure 5:
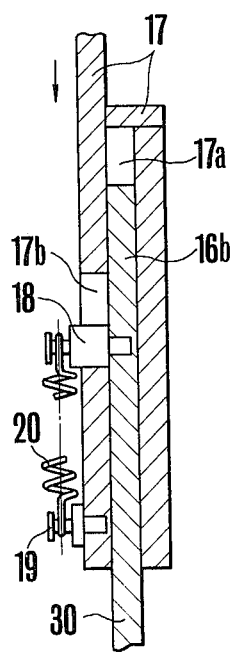
FIG. 5 is a sectional view taken along the line A-A' of FIGS. 4a and 4b.

In accordance with the invention, a connection or contraction mechanism is provided between the arm portion 16b and the actuating lever 17, with this mechanism being constructed in a manner shown in greater detail in FIG. 5. As indicated in FIG. 5, the contraction or connection mechanism is formed by providing a cavity 17a in the end portion of the actuating lever 17 and by inserting into the cavity 17a the arm portion 16b. The actuating member 17 is provided with an elongated slot 17b through which there extends a pin 18 which is mounted on the arm portion 16b which is inserted in the cavity 17a. A second pin 19 is attached on the actuating lever 17. A spring 20 is engaged in tension between the pins 18 and 19. In the structural arrangement depicted in FIG. 5, the actuating lever will always be urged in a rearward direction, and will be able to retract in a direction indicated by the arrow in FIG. 5. Referring again to FIGS. 4a and 4b, the diaphragm mechanism of the lens assembly depicted therein includes diaphragm blades 21, only one blade being shown for clarity, and a blade carrying ring 22 which is mounted in the lens barrel 1. The diaphragm actuating lever 17, the diaphragm blades 21 and the blade carrying ring 22 constitute the essential parts of the diaphragm mechanism of the lens assembly.

A spring 23 operates to urge the actuating member 16 in a clockwise direction and a spring 24 operates to urge the diaphragm actuating ring 15 in a counterclockwise direction.

A pin 25 operates as a position determining means for aligning the interchangeable lens assembly with the camera body at a predetermined position during coupling of these parts. Additionally, the pin 25 acts as a lock means for locking the interchangeable lens assembly with the camera body, the pin 25 being mounted upon an operating member 26 and extending through an aperture 2a in the bayonet carrying ring 2. The pin 25 projects with an end 25a outwardly from the fitting reference surface 5a of the mount member 5.

The operating member 26 projects radially outwardly from an open slot of the lens barrel 1 and it is always urged by a spring 27 in a direction toward the rear of the lens assembly thereby urging the pin 25 toward a projected position. The operating member 26 includes an integrally formed ring portion 26a which is held in an axial cutout portion of the stationary lens barrel 1 and which is movable in the direction of the arrow A along with the operating member 26 against the force of the spring 27 when the operating member 26 is urged in the direction of the arrow so that the pinhead 25a is retracted from the fitting reference surface 5a.

A member 28 for transmitting a signal representative of a change between the manual operating mode and the automatic mode of the diaphragm mechanism is formed with an end 28a extending through an aperture 2b in the bayonet carrying ring 2 and projecting outwardly from the reference surface 5a of the mount member 5.

Figure 6:
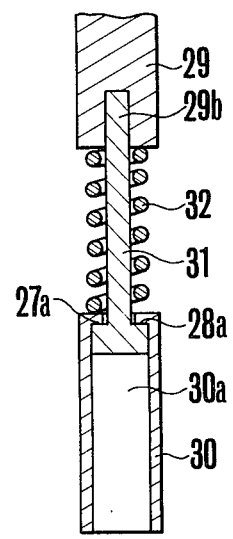
FIG. 6 is a sectional view taken along the line B-B' of FIGS. 4a and 4b.

The mode changeover signal transmitting member 28 is mounted on a first intermediate member 29 which includes an arm 29a extending to be engageable with the ring portion 26a of the operating member 26. A second intermediate member 30 is connected to the first intermediate member 29 in the manner depicted in FIG. 6. The front end of the first intermediate member 29 is formed with a recess 29b into which the front end of the second intermediate member 30 is inserted. The first intermediate member 29 and the second intermediate member 30 are urged apart by a spring 32 which is engaged therebetween and shown in FIG. 6. The front end portion of the second intermediate member 30 rides upon a tapered surface 14b of the diaphragm setting ring 14 and the location of the tapered surface 14b is arranged to correspond to the symbol "A" representing the automatic adjustment mode of the diaphragm mechanism and displayed upon the outer portion of the diaphragm setting ring 14. When the diaphragm setting ring 14 is adjusted so that the symbol "A" is in registry with an index mark 1c displayed on the outer portion of the stationary lens barrel 1, the lens assembly will be set to an operating mode whereby the diaphragm mechanism is automatically operated by the camera and when set in this automatic mode the front end portion of the second intermediate member 30 will be lifted by the tapered surface 14b so that the rear end of the changeover signal transmitting member 28 will project from the aperture 2b beyond the reference surface 5a.

The camera is provided with a camera side coupling member or bayonet ring 33 as well as with a camera side signal transmitting member 34 and a camera side drive member 35. The surface of the coupling member 33 which faces toward the fitting reference surface 5a of the lens assembly is formed with recesses 33a and 33b into which the pins 25 and 28 enter, respectively.

As previously mentioned, the camera side signal transmitting member 34 and the drive member 35 will assume positions relative to the lens side signal transmission member 7 and actuating lever 17 as depicted in FIGS. 1 and 4a before the lens is attached to the camera. After the lens has been attached to the camera by rotation of the lens assembly in the direction of the arrow B, the positional relationship between these parts will be changed and will be as is depicted in FIG. 4b. The actuating lever 17 will be urged by the spring 23 in a clockwise direction in order to abut against one end of the arcuate slot 6b. After the completion of the attachment operation with the parts in the positions indicated in FIG. 4b, the camera side drive member 35 and the lens side actuating lever 17 will have their positions reversed, as indicated in FIGS. 1 and 2. That is, the actuating lever 17 will be on the opposite side of the drive member 35.

When the lens assembly is initially attached to the camera, the position adjusting index (not shown) on the lens assembly must be aligned with a position adjusting index (not shown) on the camera so that the bayonet ring 3 of the lens assembly will be appropriately aligned with the bayonet ring 33 on the camera so that the bayonet pawls may be properly positioned relative to each other to enable coupling of the bayonet mechanism when the lens assembly is rotated. When this alignment has been established, the interchangeable lens is rotated in the direction of arrow B shown in FIG. 3b. When the rotating movement of the lens assembly reaches a predetermined angle of rotation, the position determining means or pin 25 will have its end or head portion 25a inserted into the recess 33a on the camera bayonet ring 33 whereby rotation of the interchangeable lens assembly will be stopped with the bayonets in tightened engagement. During this rotation of the lens assembly, the preset mechanism, the diaphragm signal transmitting member 7 and the actuating lever 17 will also be rotated together with the lens assembly. The actuating lever 17 will come to an intermediate point during the rotation of the lens assembly and will abut the camera side drive member 35. Further rotation of the lens assembly will cause the actuating lever 17 to be rotated in the clockwise direction while permitting the lever 17 to be contracted or to move in the direction of the arrow C, as best seen in FIG. 4a. This movement of the lever 17 will occur as a result of the resultant of forces thereon produced by the tapered surface 17d engaging with the drive member 35. It will be seen that when the actuating lever 17 rides against the drive member 35, a force will be applied thereto in the direction of the arrow C tending to contract the contracting mechanism shown in FIG. 5 so that when the actuating lever 17 has angularly passed the drive member 35, the lever 17 will ride off the drive member 35 and will then be allowed to extend to its initial length by the spring force of the spring 20 as indicated in the structure described in FIG. 5.

As a result, the positional relationship of the drive member 35 relative to the lever 17 will be angularly reversed.

The signal transmitting member 7 is rotated from the position shown in FIG. 4A as the lens is rotated with reference to the camera, and when the lens assembly comes to a position where the coupling lock mechanism (25, 26, 27, 33a) is acted upon to effect the bayonet connection, it is arranged to enable it to abut the camera side signal transmitting member 34 (see FIG. 3c).

In the condition where the state of attachment of the lens assembly with the camera body is complete, as shown in FIG. 3c, the signal transmitting member and the actuating lever 17 on the lens side will be positioned in relationship to the camera side signal transmitting member 34 and drive member 35 so as to be engageable therewith. With the diaphragm setting ring 14 set to the manual operating mode, the arm 13a of the preset cam ring 13 and the arm 7a of the signal transmitting member 7 will be moved by the force of the spring 12 in response to the aperture value set by the ring 14 whereby the aperture value will be preset in the preset cam ring 13 and in the bell crank 13'. At the same time, the signal transmitting member 7 causes the camera side signal transmitting member 34 to rotate in response to the value set on the diaphragm ring 14. Since the camera side signal transmitting member 34 is actuated in response to an exposure control mechanism in the camera, aperture value information dependent upon the amount of movement of the signal transmitting member 34 will be developed in the lens assembly.

With the diaphragm setting ring 14 in the automatic exposure mode i.e. set to the A position the signal transmitting member 28 of the selection mechanism (14b, 29, 30, 31, 32, 28) for the manual adjusting mode and automatic adjusting mode of the interchangeable lens assembly will project outwardly of the reference surface 5a since the second intermediate member 30 will be located on the tapered surface 14b and thus the camera side exposure control mechanism (not shown) will be changed to the automatic exposure control mode. In a case where the interchangeable lens assembly is set at the automatic adjusting mode, the signal transmitting member 7 holds the camera side signal transmitting member 34 in a predetermined position.

Upon release actuation of the release mechanism in the camera, the drive member 35 in the camera will move in the direction A shown in FIGS. 3b and 3c, and this movement of the drive member 35 will cause the lens side actuating lever 17 to be rotated in a counterclockwise direction thereby driving the arm 16a and the diaphragm actuating ring 15. With the diaphragm setting ring 14 in the manually adjusting mode, the diaphragm blades 21 of the diaphragm device will be closed down to an aperature size corresponding to the aperature value set in the diaphragm preset mechanism.

In the case where the diaphragm setting ring 14 is set in the automatic adjusting mode, the camera side signal transmitting member 34 is moved from the predetermined position to a position corresponding to an aperture value determined by aperture value information developed in the camera exposure control mechanism. The lens side signal transmitting member 7 also moves while following the camera side transmitting member 34 whereby the diaphragm preset mechanism is actuated to effect a presetting to an aperture value determined in the camera.

Subsequently, the camera side release mechanism will operate further to move the actuating lever 17 and the actuating member 16, thus closing down the diaphragm mechanism to an aperature value corresponding to the aforementioned aperture value information.

During actuating of the camera with the lens assembly in the performance of an exposure operation, the lens assembly never rotates with reference to the camera inasmuch as the head portion 25a of the position determining pin 25 serves as a lock pin fitted in the lock hole or recess 33a of the camera side bayonet member 33 and thus there is avoided the possibility of the occurrence of an offsetting of the interchangeable lens side fitting reference surface 5a relative to the camera side fitting reference surface defined in the bayonet coupling ring 33.

When the interchangeable lens assembly is detached from the camera in a situation where the diaphragm setting ring 14 is set in the automatic exposure mode, the head portion of the changeover signal transmitting member 28 is in fitting engagement with the aperture 33b of the camera bayonet member 33. Because of this, the detachment of the lens assembly and the camera involves a basically two-step operation in that, while depressing the operating member 26 in the direction of the arrow A, the operator rotates the interchangeable lens assembly in a direction reversed to the direction of arrow B shown in FIG. 3b whereby the member 28 and the pin 25 are retracted through their respective apertures 2a and 2b against the force of the spring 27. Subsequently, the bayonets 3 and 33 of the lens assembly and the camera may be moved out of engagement with each other by appropriate rotation of the lens assembly components.

During the operation whereby the lens assembly is detached from the camera, the actuating lever 17 will ride across the camera side drive member 35. That is, as the lens assembly is rotated in the clockwise direction from the position shown in FIG. 4b, the actuating lever 17 while being pressed by the drive member 35 is contracted in the direction of Arrow C shown in FIG. 4b.

When the end of the lever 17 has cleared the forward end of the drive member 35, it may once again be elongated to its initial position by the action of the spring 20.

Thus, with the lens assembly detached from the camera, whereby the elements will be in the position depicted in FIG. 1, the spring 23 urges the lever 17 to its initial position to the end of the arcuate slot 6b.

A second embodiment of the invention is depicted in FIGS. 7 and 8. In this embodiment not only are the actuating members 16, 16b and 17 provided with the contracting or position exchange mechanism such as that depicted in FIG. 5, but this type of mechanism is also provided for the signal transmitting means 7, 8 whereby these members may also be contracted during movement of the type indicated above. In modern day cameras, the greater complexity of features which are provided tends to create greater demands upon available space which may be occupied by various elements. For example, it is known that the functions of a camera increase with the provision of aperture priority exposure control means and shutter priority exposure control means and selector means therefor. In dual priority exposure control cameras and in cameras which include light metering systems of the type wherein light entering through the objective lens is directly used in measuring the light value i.e. cameras involving direct light metering devices, the camera body is devoid of sufficient vacant space to facilitate movement of the various operating parts thereof. There thus arises a need to diminish the amount of space necessary for movement of the various operating elements of such a camera.

The second embodiment of the invention depicted in FIGS. 7 and 8 is intended to provide an interchangeable lens assembly which is applicable to a camera which is subjected to the limitations of the dynamic range of the signal transmitting member.

In FIG. 7, all of the mechanisms with the exception of the contracting means, which is provided for the front end 8 of the signal transmission mechanism provided in the arm portion 7b of the signal transmitting member 7, are similar to many of those shown in FIGS. 4a, 4b, 4c, 5 and 6.

In the contracting mechanism of the FIG. 7, a signal lever 8 cooperates with the arm 7b of the signal transmission member 7. A contracting mechanism is provided therebetween which is shown in greater detail in sectional view in FIG. 8. As indicated in FIG. 8, a cavity 8a formed in one end of the signal lever 8 receives the arm 7b of the signal transmission member 7. An elongated slot 8b is formed in one wall of the member 8 and a pin 7c extends through the slot 8b. A spring 10 is engaged in tension between the pin 7c and a pin 8c mounted on the end of the signal lever 8. As a result of this arrangement, the signal lever 8 may be extended toward the rear of the lens assembly and it is capable of retraction or of contracting movement of the signal transmission arm toward the front of the lens assembly or in the direction of the arrow depicted in FIG. 7. The rear of the signal lever 8 extends through and outwardly beyond an arcuate slot 6a of the rear cover member 6 and is arranged to be engageable with a camera side signal transmitting member.

The arm 7a of the signal transmitting member 7 engages with the preset cam ring 13 and the spring 12 urges the preset cam ring 13 in a counterclockwise direction to engage the diaphragm actuating ring 15 of the diaphragm mechanism through the crank lever 13'. An engaging relationship between the preset cam ring 13 and the diaphragm mechanism (21, 15, 13') with the preset cam ring 13 is similar to that described in connection with the first embodiment disclosed herein.

Before attachment of a lens assembly constructed in accordance with FIGS. 7 and 8, when the interchangeable lens assembly is placed in position for attachment to the camera, position adjusting marks (not shown) on each of the lens assembly and the camera are placed in registry with each other and the signal members 8, 35 and the actuating members 17, 34 will assume the positions depicted in FIG. 3b.

As the interchangeable lens assembly is rotated in the direction of arrow B, when the lens side coupling means 3 and the camera side coupling means 33 are brought into tightened engagement with each other, the front end member 17c of the actuating member 17 will change its position from the left side of the camera drive member 35 to the right side thereof, as has been previously described in detail in connection with the first embodiment of the present invention.

During the attachment operation, the signal transmission member 8 with its front end will abut against the wall surface of a mirror box member 36 (see FIG. 3a) positioned in front of a mirror 37 of the camera body. As a result of this abutment, the front end 8 will be retracted as it slides on the wall surface 36 thus effecting a contraction of the elongate member consisting of the arm 7b and the arm 8. As the front end 8a of the arm 8 slides off the wall surface 36 it will extend back to its initial length. When the coupling of the lens assembly with the camera is completed, with the front end 25a of the lock pin 25 engaging the lock groove 33a on the camera side, the signal transmission member 8 will be in a position in operative association with the signal transmission member 35 in the camera.

The operation of the interchangeable lens assembly of the type depicted in FIGS. 7 and 8 is generally similar to that of the previously described embodiment and the relative positioning of the signal members and of the actuating members after attachment of the interchangeable lens assembly to the camera will be generally alike.

When the diaphragm setting ring is in the manual operating mode, and when the ring 14 is turned to a particular aperture value, the lens side signal transmitting member 7 is preset to a set aperture value by the spring action of the spring member 12 as a result of engagement of the engagement portion 14a of the diaphragm setting ring 14. Through this operation, the lens side diaphragm preset information is transmitted through the camera side signal transmitting member 34 to the exposure control mechanism in the camera.

When a camera release operation actuates a release mechanism, the drive member in the camera is driven to move in the direction of the arrow A shown in FIG. 3c thereby driving the lens side actuating member 16 to move in the A direction. This operation causes the actuating member 15 to rotate thus closing down the diaphragm blades 21 to the preset aperture value.

Other phases of operation of the lens assembly of FIGS. 7 and 8 may be assumed to be generally similar to the operating modes described in connection with the first embodiment.

When the interchangeable lens assembly is detached from the camera, the lens lock mechanism (26, 27, 25, 33a) and the manual-automatic changeover mechanism (28, 29) operate in a manner similar to that described in connection with the first embodiment.

As indicated by the foregoing, the present invention is suitable particularly for use in a lens assembly which requires that the actuating member of the lens assembly and the drive member of the camera body operate to exchange their mutual positional relationship thereby simplifying the mechanism for effecting such exchange without causing mechanical interference and without diminishing the effectiveness of the operative connection between the lens assembly and the camera body.

While a specific embodiment of the invention has been shown and described in detail to illustrate the application of the inventive principles, it will be understood that the invention may be embodied otherwise without departing from such principles.

What is claimed is:

1. An interchangeable lens assembly for a camera including an exposure control mechanism and driving signal transmitting means comprising:
   coupling means adapted to engage complementary coupling means on said camera for mounting said lens assembly on said camera;
   exposure control means for determining the quantity of exposure passing through said lens assembly;
   actuation signal transmitting means adapted to operably engage said driving signal transmitting means of said camera for transmitting a driving signal between said lens assembly and said camera; and
   position interchanging means for effecting interchange between the relative positions of said actuation signal transmitting means and said driving signal transmitting means.

2. An assembly according to claim 1 wherein said position interchanging means is structured to be displaced along the optical axis of said lens assembly at least when said lens assembly is being attached to said camera thereby to effect said position interchange.

3. An assembly according to claim 2 wherein said actuation signal transmitting means include contraction means for effecting interchange of the relative positions of said actuation signal transmitting means and said driving signal transmitting means.

4. An assembly according to claim 3 wherein said actuation signal transmitting means comprises a first component engaging with said driving signal transmitting means of said camera and a second component operatively connected with said control means, with said contraction means being arranged between said first and said second components.

5. An assembly according to claim 4 wherein said contraction means include spring means enabling said first component to be axially contracted relative to said second component.

6. An assembly according to claim 5 wherein the end portion of said first component is formed with a tapered configuration.

7. An assembly according to claim 2 wherein said position interchanging means comprise means for effecting contraction of the axial length of said actuation signal transmitting means thereby to effect said position interchange.

8. An interchangeable lens assembly for a camera including an exposure control mechanism, a driving signal member and an exposure control signal transmitting member comprising:
   coupling means adapted to engage complementary coupling means on said camera for mounting said lens assembly on said camera;
   diaphragm means for controlling the quantity of light passing through said lens assembly;
   driving signal transmitting means including position changing means for changing the relative positions between said driving signal transmitting means and said driving signal member; and
   exposure control signal transmitting means disposed to operatively connect with said exposure control signal transmitting member, said exposure control signal transmitting means operating to transmit an exposure control signal between said lens assembly and said exposure control mechanism.

9. An interchangeable lens assembly for a camera comprising:
   a diaphragm mechanism;
   an aperture value signal transmitting member adapted to transmit aperture value signals between said lens assembly and said camera for controlling said diaphragm mechanism, said aperture value signal transmitting member being adapted to extend from said lens assembly into said camera into operative engagement with an aperture value control member in said camera;
   a diaphragm drive transmission member adapted to extend from said lens assembly into said camera into operative engagement with a diaphragm driving member in said camera to transmit a diaphragm actuating force from said camera to said diaphragm mechanism; and
   means on at least one of said aperture value signal transmitting member and said diaphragm drive transmitting member operative to enable said one member to have the end thereof extending into said camera retracted away from said camera when said lens assembly is being mounted on said camera in order thereby to avoid interference with the movement of said one member during mounting of said lens assembly, said one member being spring biased in a direction away from said retracted position.

10. An assembly according to claim 9 wherein both said aperture value signal transmitting member and said drive transmitting member include said means enabling said member to be retracted away from said camera during mounting of said lens assembly and to be spring biased in a direction to its original position.

11. An interchangeable lens assembly for a camera including an exposure control mechanism and driving signal transmitting means comprising:
   coupling means adapted to engage complementary coupling means on said camera for mounting said lens assembly on said camera;
   exposure control means for determining the quantity of exposure light passing through said lens assembly;
   position defining means operative in cooperation with complementary position defining means on said camera for restraining said lens assembly from rotational movement relative to said camera during mounting and dismounting thereof, said lens assembly including a reference surface brought into engagement with a complementary surface on said camera during mounting of said lens assembly, with said position defining means having a head portion thereof arranged to protrude from said reference surface of said lens assembly and into engagement with said complementary position defining means on said camera; and exposure control mode changing means for changing the operating mode of said lens assembly between an automatic exposure control mode and a manual exposure control mode, said exposure control mode changing means having a head portion, said head portion operating to protrude from said reference surface for transmitting a control mode change signal to said camera, said head portion of said control mode changing means being operated by said operation means, said exposure control mode changing means further comprising contraction means for contracting said head portion of said control mode changing means by said operation means.

12. An interchangeable lens assembly for a camera including an exposure control mechanism, driving signal transmitting means and exposure signal transmitting means comprising:
- coupling means adapted to engage complementary coupling means on said camera for mounting said lens assembly on said camera;
- exposure control means for determining the quantity of exposure light passing through said lens assembly;
- first signal transmitting means for transmitting a driving signal from said camera to said lens assembly;
- second signal transmitting means for transmitting exposure control signals between said lens assembly and said camera;
- position defining means including a position defining member for locking said lens assembly in position on said camera, said position defining means being urged in the direction of the optical axis of said lens assembly by an urging member and having an unlocking operation member for releasing said lens assembly; and
- exposure control mode changing means for changing the operating mode of said lens assembly between an automatic exposure control mode and a manual exposure control mode, said exposure control mode changing means having a transmitting member for transmitting a control mode change signal between said lens assembly and said camera, said exposure control mode changing means including contraction means for contracting said transmission member.

13. An interchangeable lens assembly for a camera comprising:
- coupling means adapted to engage complementary coupling means on said camera for mounting said lens assembly on said camera;
- position defining means operative in cooperation with complementary position defining means on said camera for restraining said lens assembly from rotational movement relative to said camera during mounting thereof on said camera, said position defining means having a head portion biased toward said camera from said lens assembly, said head portion engaging with said complementary position defining means of said camera to set said lens assembly at a predetermined position relative to said camera when said coupling means is coupled with said complementary coupling means; and
- disengaging means for retracting said head portion into said lens assembly by operation outside said lens assembly to release engagement thereof with said complementary position defining means thereby enabling dismounting of said lens assembly from said camera.

14. An interchangeable lens assembly for a camera comprising:
- coupling means adapted to engage complementary coupling means on said camera for mounting said lens assembly on said camera;
- exposure control mode changing means for changing the operation mode of said lens assembly between an automatic exposure control mode and a manual exposure control mode, and having a transmitting member for transmitting a control mode change signal between said lens assembly and said camera; said lens assembly including a reference surface brought into engagement with a complementary surface on said camera during mounting of said lens assembly, said transmitting member being biased so as to project toward the camera from said reference surface and being able to retract into said lens assembly when the engagement of the lens assembly with the camera is incomplete.

15. An interchangeable lens assembly according to claim 13 or 14 wherein said heat portion of said position defining means and an end portion of said transmitting member of said exposure control mode changing means are biased by a spring member to project from the reference surface of said lens assembly toward said camera, and wherein, said head portion and said end portion are designed so as to be capable of retracting into said lens assembly.

16. An interchangeable lens assembly according to claim 14, wherein said exposure control mode changing means include contraction means for contracting said transmitting member in response to a pushing force from outside said lens assembly.

17. An interchangeable lens assembly for a camera comprising:
- coupling means adapted to engage complementary coupling means on said camera for mounting said lens assembly on said camera;
- exposure control mode changing means for changing the operation mode of said lens assembly between an automatic exposure control mode and a manual exposure control mode, said exposure control changing means having a transmitting member, said transmitting member operating to protrude from a reference surface of said lens assembly for transmitting a control mode change signal to said camera;
- position defining means operative in cooperation with complementary position defining means on said camera for restraining said lens assembly from rotational movement relative to said camera during mounting thereof, with said position defining means having a head portion thereof arranged to protrude from said reference surface of said lens assembly and into engagement with said complementary position defining means on said camera; and
- operation means to draw said head portion and said transmitting member back away from protrusion from said reference surface.

* * * * *